(12) United States Patent
Lacaze et al.

(10) Patent No.: US 6,503,286 B1
(45) Date of Patent: Jan. 7, 2003

(54) FUEL COMPOSITION IN THE FORM OF AN EMULSION DERIVED FROM HETEROGENEOUS GREASY WASTE AND METHOD FOR MAKING SAME

(75) Inventors: Pierre Lacaze, Léyme (FR); Mouloud Hendou, Bannes (FR); Jean-Claude Collin, Marsinval-Vernouillet (FR); Patrick Flament, Auffargis (FR)

(73) Assignees: Institut Francais du Petrole, Rueil Malmaison Cedex (FR); Lacaze S.A., Leyme (FR)

( * ) Notice: Subject to any disclaimer, the term of this patent is extended or adjusted under 35 U.S.C. 154(b) by 0 days.

(21) Appl. No.: 09/807,376

(22) PCT Filed: Oct. 1, 1999

(86) PCT No.: PCT/FR99/02366

§ 371 (c)(1),
(2), (4) Date: Jun. 11, 2001

(87) PCT Pub. No.: WO00/22069

PCT Pub. Date: Apr. 20, 2000

(30) Foreign Application Priority Data

Oct. 12, 1998 (FR) .............................................. 98 12751

(51) Int. Cl.[7] ................................................. C10L 1/00
(52) U.S. Cl. .................................. 44/301; 516/22; 43/2
(58) Field of Search ............................. 44/301; 516/22; 431/2

(56) References Cited

U.S. PATENT DOCUMENTS

| 4,842,616 A | 6/1989 | Verhille |
| 5,380,343 A | 1/1995 | Hunter |

FOREIGN PATENT DOCUMENTS

| DE | 221526 | * 4/1985 |

* cited by examiner

*Primary Examiner*—Cephia D. Toomer
(74) *Attorney, Agent, or Firm*—Millen, White, Zelano & Branigan, P.C.

(57) ABSTRACT

Combustible compositions in the form of homogeneous water-in-oil and/or organic emulsions, deriving from heterogeneous fatty waste and containing solid particles in suspension are prepared by carrying out a dynamic homogenisation operation and an emulsification operation in the presence of an emulsifying agent and/or a base such as an alkali or alkaline-earth metal hydroxide. These combustible compositions can be used for combustion in a variety of furnace types.

29 Claims, No Drawings

FUEL COMPOSITION IN THE FORM OF AN EMULSION DERIVED FROM HETEROGENEOUS GREASY WASTE AND METHOD FOR MAKING SAME

This application is a 371 of PCT/FR99/02366, filed Oct. 1, 1999.

FIELD OF THE INVENTION

The present invention relates to a combustible composition in the form of an emulsion, to a process for its production from heterogeneous fatty waste and to a combustion process using this combustible composition.

BACKGROUND OF THE INVENTION

Organic waste such as that from the agro-food industry (meat flour, viscera, etc.) are characterized by a moderate gross calorific value but cause enormous problems with combustion, in particular because of their substantial heterogeneity.

Thus when supplying combustion apparatus with such waste, the heterogeneity of the waste renders it difficult to manipulate and combustion regulation is hazardous. Combustion furnaces supplied by that type of waste are subjected to substantial and rapid variations in calorific value: such a modus operandum is technically unacceptable for a conventional combustion facility.

Further, because of the heterogeneity of the waste, the combustion furnace can come into contact with either a fraction of waste with a very high volatile matter content or with a waste fraction which is depleted in volatile material. Whatever the case, combustion causes problems: in the first instance, combustion is very rich and the temperatures reached in the furnace cause material resistance problems; in the second case, combustion is poor and results in residues and unburned material.

SUMMARY OF THE INVENTION

The present invention aims to overcome the problems mentioned above.

In particular it aims to provide, from heterogeneous fatty organic waste, a stable homogeneous combustible composition in the form of an emulsion. It also aims to provide a process that can easily produce such a combustible composition. It further aims at providing a combustion process which has none of the disadvantages observed during combustion of untreated fatty waste.

DETAILED DESCRIPTION OF THE INVENTION

In general, the combustible composition of the invention consists of a water-in-oil and/or organic compound emulsion, which is homogeneous and stable, formed from heterogeneous fatty waste and further containing solid particles in suspension.

In the combustible composition of the invention, the water is in the form of droplets dispersed in the continuous phase, which is an organic phase or a fatty phase.

It should be noted that, in terms of combustion, an emulsion of water in an organic material is more interesting than an emulsion of an organic material in water, as if the continuous phase were water, sufficient energy would have to be added to the combustion apparatus to evaporate the water surrounding the organic material before triggering combustion, while if the continuous phase were the organic material, it would be sufficient to supply energy to reach the ignition temperature of the fatty phase to trigger combustion: in the solution recommended by the invention, the heat released on combustion is used to evaporate the water contained in the composition.

Depending on the nature of the fatty waste treated to prepare the combustible composition of the invention, the distribution by weight between the different constituents can be as follows:

10% to 60% by weight of water;
10% to 60% by weight of fats; and
1% to 80% by weight of solid matter.
A preferred weight distribution is:
10% to 55% by weight of water;
15% to 45% by weight of fats; and
3% to 75% by weight of solid matter.

The solid matter generally contained in the combustible compositions of the invention are generally in the form of pieces with relatively homogeneous sizes with their largest dimension of 10 cm or less, preferably 2 cm or less and more preferably, 1 cm or less.

The combustible compositions of the invention generally have a net calorific value (NCV) of at least 6000 kJ/kg, preferably at least 10000 kJ per kilogram.

In general, production of the combustible compositions of the invention comprises two principal operations:

a) reducing the granulometric heterogeneity of the waste; and b) forming an emulsion by agitation, and optionally adding an emulsifying agent.

The two operations can be combined into a single step or dissociated into a plurality of steps carried out in succession.

More particularly, the starting fatty waste can consist of all sorts of waste from the agro-food industry, animal flour, waterfowl viscera, etc.

By way of indication, the proportion of fats in animal flour is generally 10% to 35% by weight. This proportion can, for example, be 20% to 40% by weight in viscera. In these, the proportion of water can, for example, be 35% to 55% by weight.

To reduce the heterogeneity of fatty waste, it is subjected to a homogenisation operation (a) termed a "dynamic homogenisation operation" which can, for example, consist of shredding, grinding, chopping or any other operation enabling the size difference between the various solid components of the waste to be reduced. This operation can be carried out, for example, in a grinder, a chopper or any other apparatus that can shear the fatty waste pieces. The operation can be carried out in batches or continuously.

As already indicated above, the granulometry which is to be obtained can correspond to particles with a variety of shapes, the largest dimensions of which can be 10 cm or less, preferably 2 cm or less, and more preferably, 1 cm or less.

The temperature at which homogenisation is carried out is generally less than 70° C. and preferably less than 55° C., for reasons which will be given below.

Emulsion formation or structure homogenisation (operation (b) in the production process of the invention) is carried out by agitating the fatty waste after or simultaneously with operation (a) carried out above.

The water in the emulsion composition constituting the dispersed phase can originate from the treated organic waste. It can also be water added during the emulsion formation step. In general, it is preferable not to add water.

The emulsion is formed by agitation and optional addition of an emulsifying agent which is preferably soluble in the organic (or fatty) phase. Compounds with a low hydrophilic/lipophilic balance (HLB) are selected. This balance, which represents the relative weight of the fatty chain of the molecule to the solubilising group, is in the range 2 to 8, preferably in the range 3 to 6.

Groups of emulsifying compounds encouraging the formation of an emulsion of water in the fat include ethoxylated or propoxylated alcohols, fatty acids or esters, amines or amides with high molecular weights. Preferably, higher fatty alcohols are selected, such as sterols or polyglyol mono- and di-esters with a short polyglycolic chain.

The amount of such emulsifying compounds with respect to the overall weight of the liquid mixture, fat plus water, will be in the range 0.5% to 5% by weight and preferably 1% to 3% by weight.

Sulfonated or sulfated oil type emulsifying agents can also be used, but during combustion they liberate non-negligible quantities of oxides of sulfur.

Pairs of emulsifying agents, with different behaviours when taken separately can, when they are associated in suitable proportions, lead to stable water-in-oil emulsions. Examples that can be cited are higher alcohol esters mixed with quaternary ammonium salts.

In a preferred version of the invention, the emulsifying agent is produced in situ by adding to the waste traces of a base generally consisting of an alkali or alkaline-earth metal hydroxide such as sodium, potassium, calcium or magnesium hydroxide, after or during granulometric homogenisation.

Fatty waste contains traces of free fatty acids and also undergoes partial hydrolysis, which liberates fatty acids and alcohols (in general glycerol). As a result, adding an alkaline or alkaline-earth base causes neutralisation of the acids and the formation of alkaline or alkaline-earth soaps, which act as emulsifying agents during emulsion preparation.

If the organic fraction contained in the waste is represented as being in the form of triglycerides, the reactions can be schematically represented as follows:

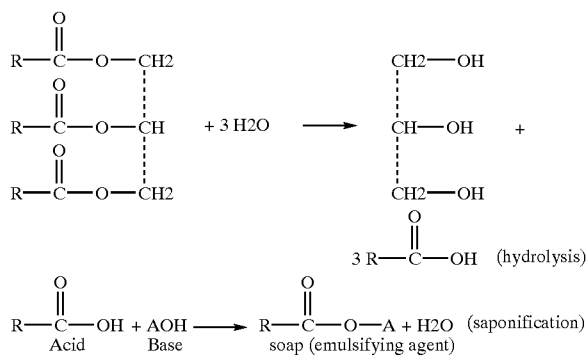

The hydrolysis reaction is encouraged by raising the temperature, so it is recommended that the dynamic homogenisation reaction operation (a), intended to reduce the granulometric heterogeneity, be carried out at low, controlled temperatures, for example less than 55° C., as advanced hydrolysis causes an increase in the acidity of the waste, which necessitates the use of larger amounts of base to neutralise the acids. This phenomenon is a disadvantage for two reasons; the first is economic and the second is linked to combustion. In fact, the addition of large quantities of bases reduces the calorific value of the final fuel and causes combustion residues in the form of alkaline salts.

As a result, in a preferred version of this invention, the dynamic homogenisation operation (a) is carried out at temperatures of less than 70° C., preferably less than 55° C. for the reasons given above, and to prevent any breakdown phenomenon causing rupture of the emulsion.

The emulsification operation (b), the choice of the neutralising base or the emulsifying agent is fundamental. The present invention seeks to produce a fuel in the form of an emulsion of water in the organic matter and not of organic matter in water, preferably simply by using the water initially contained in the waste.

In the case of using a neutralising base, a concentrated aqueous solution with a content of 10% to 40% by weight, preferably 20% to 30% by weight is preferably used. Too dilute a base can in effect cause the formation of an emulsion of organic matter in water, and a reduction in the calorific value of the fuel.

In order to produce a fuel in the form of a water-in-organic matter emulsion, it is vital that the alkaline or alkaline-earth soap formed by adding a base to the waste, or the emulsifying agent, is more soluble in the organic fraction composing the waste than in the water.

Production of the fuel necessitates, in operation (b), intimate contact between the waste and the emulsifying agent or the neutralising base. It is recommended the waste-emulsifying agent mixture and/or neutralising base be agitated for 3 to 4 minutes using an apparatus which can provide a mixing energy in the range 50 to 500 kJ per kilogram of waste, preferably in the range 100 to 250 kJ per kilogram of waste.

Steps (a) and (b) for producing the fuel as mentioned above are given by way of indication. This does not exclude the production of the fuel in a single step combining granulometric homogenisation and emulsion production.

In accordance with the invention, it is possible to add an agent which blocks fermentation to the organic phase of the emulsion and, in order to increase the calorific value of the combustible composition, one or more hydrocarbon fuels such as a fuel oil.

The combustible compositions of the invention obtained from heterogeneous fatty waste are in the form of homogeneous and stable emulsions, which are easy to manipulate and to use in a variety of types of conventional combustible facilities such as horizontal furnaces, vertical furnaces, step furnaces or step-heart furnaces, rotary furnaces, fluidised bed- or circulating bed furnaces or rotary cupola furnaces or any other furnace type which can admit liquid and/or paste products.

The entire disclosure of all applications, patents and publications, cited above and below, and of corresponding French application 98/12751, filed Oct. 12, 1998, are hereby incorporated by reference.

EXAMPLES

The advantages of the compositions of the invention will be elucidated below in the particular case of energetic upgrading of waterfowl viscera by combustion.

In order to qualify and quantify the advantages of the invention, combustion tests were carried out in a hearth furnace in the two following cases: heterogeneous unrefined viscera and an emulsion prepared by the present invention using unrefined viscera.

Example 1

Comparative

In the case of a heterogeneous unrefined product, a variety of problems were encountered, including:

the difficulties of supplying the furnace with the product: even using a plurality of techniques (gravity feed, endless screw feed, pressurised feed), it was almost impossible to effect supply at a regular rate;

storage of the charge in a buffer tank was very difficult: after a few hours, the charge had stratified with greasy water leaching out, which caused difficulties with combustion, in particular extinction of the flame when the furnace was supplied with the greasy water fraction;

combustion in the furnace was irregular because of the difference in NCV of the product, from 40000 kJ/Kg for the fatty fraction to 5000 kJ/kg for the solid waste fraction. This disparity in NCV rendered combustion automation very difficult, in particular as regards supplying with air for combustion;

it was not possible to carry out complete combustion of the waste: the combustion residue was in the form of coke and represented 1% to 2% by weight of the treated charge. The coke, characterised by a low density, was accumulated in the hearth, which reduced the bulk capacity of the apparatus;

the maximum flow rate that could be treated by the furnace was 30 kg/h.

Example 2

In Accordance with the Invention

With an emulsion of the invention, the difficulties cited above were overcome:

the product was easy to transport simply by pumping and the burner could be supplied continuously;

the emulsified product did not become stratified so it was possible to vary its viscosity by heating to facilitate pumping;

the NCV of the product arriving at the burner was constant over time and equalled the mean NCV;

the maximum burner flow rate was no longer limited to 30 kg/h. Tests at a rate of 50 kg/h were carried out successfully, only limited by the pumping capacity of the charge;

the vaporised fuel and the air could be mixed simply and effectively, preventing coke formation;

burner regulation was facilitated by the possibility of supplying the burner continuously.

The advantages mentioned above are summarised in the following table:

| Unrefined viscera | Ground and emulsified viscera |
| --- | --- |
| Batch supply | Continuous supply |
| Stratification, causing variable NCV | Mean NCV |
| Wide range of combustion rates | Narrower range |
| Regulation difficult | Simplified regulation |
| Presence of rich zones, coking sources | Absence of rich zone-air-fuel mixture homogeneous-less coking |
| Heating fuel impossible and in any event not advisable (stratification) | Heating possible in the case of an emulsion |

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A combustible substantially homogeneous composition comprising solid particles suspended in a stable water-in-oil emulsion comprising an oil phase, a water phase and emulsifier, said solid particles and said oil phase being derived substantially from dynamically homogenized heterogeneous organic agro-food industry fatty waste products.

2. A combustible substantially homogenous composition comprising solid particles suspended in a stable water-in-oil emulsion comprising a fatty oil phase, a water phase and an emulsifier, said fatty oil phase and said solid particles consisting essentially of dynamically homogenized organic agro-food industry waste products.

3. A composition according to claim 1, wherein the emulsifier is present in a concentration of 0.5 to 5% by weight of the overall weight of the oil phase and the water phase.

4. A composition according to claim 3, wherein the concentration of the emulsifier is 1% to 3% by weight.

5. A composition according to claim 1, wherein the organic fatty waste product comprises animal flour.

6. A composition according to claim 1, wherein the organic fatty waste product comprises viscera.

7. A combustible composition according to claim 1, characterized in that it comprises 10% to 60% by weight of water, 10% to 60% by weight of fats and 1% to 80% by weight of said solid particles.

8. A combustible composition according to claim 1, characterized in that it comprises 10% to 55% by weight of water, 15% to 45% by weight of fats and 3% to 75% by weight of said solid particles.

9. A combustible composition according to claim 1, wherein the solid particles have a 2 cm maximum size across their widest dimension.

10. A combustible composition according to claim 1, wherein the solid particles have a 1 cm maximum size across their widest dimension.

11. A combustible composition according to claim 1, having a net calorific value (NCV) of at least 6000 kJ/kg.

12. A process for producing a combustible composition according to claim 1, comprising carrying out (a) granulometric homogenization of a fatty waste and (b) forming a water-in-oil emulsion, carried out during or after the granulometric homogenization (a).

13. A process according to claim 12 wherein granulometric homogenization (a) is carried out at a temperature of less than 70° C.

14. A process according to claim 12 wherein emulsion formation (b) is carried out with agitation by adding an emulsifying agent soluble in the fatty and/or organic phase.

15. A process according to claim 14 wherein emulsifying agent is an ethoxylated or propoxylated alcohol, fatty acid or ester, amine or amide or a mixture of two or more of those compounds.

16. A process according to claim 14 wherein the emulsifying agent is selected from the group consisting of alkaline metal or alkaline-earth soaps and sulfonated or sulfated oils.

17. A process according to claim 14 wherein the emulsifying agent has a hydrophilic/lipophilic balance (HLB) in the range 2 to 8.

18. A process according to claim 14 wherein the amount of emulsifying agent with respect to the overall mass of the emulsion is in the range 0.5% to 5% by weight.

19. A process according to claim 14 wherein the emulsion formation (b) is implemented with agitation by adding at least one base selected from the group consisting of alkali metal hydroxides and alkaline-earth hydroxides.

20. A process according to claim 19 wherein the base is used in the form of an aqueous solution with a concentration of 10% to 40% by weight.

21. A process according to claim 12 wherein agitation carried out in operation (b) is carried out using a mixing energy of 50 to 500 kJ per kilogram of waste.

22. A combustible composition according to claim 1, further comprising in the oil phase at least one of an agent blocking fermentation and at least one liquid hydrocarbon.

23. In a method of operating a combustion furnace, comprising burning a combustible composition in said combustion furnace, the improvement comprising burning a combustible composition according to claim 1.

24. A process according to claim 17 wherein the HLB is in the range of 3 to 6.

25. A process according to claim 20 wherein the concentration of the base is 20 to 30% by weight.

26. A process for producing a combustible composition comprising suspended solids in a stable water-in-oil emulsion formed from heterogeneous fatty waste, said process comprising conducting a granulometric homogenization of said fatty waste, and implementing emulsion formation by adding to the fatty waste during or after homogenization at least one base selected from the group consisting of alkali metal hydroxides and alkaline earth metal hydroxides.

27. A process according to claim 26, wherein the base is used in the form of an aqueous solution with a concentration of 10% to 40% by weight.

28. A process according to claim 27, wherein the concentration of the base is 20 to 30% by weight.

29. A combustible composition comprising suspended solids in a stable water-in-oil emulsion formed from comminuting heterogeneous solid waste, said emulsion further comprising in the oil phase at least one agent blocking fermentation.

* * * * *